(12) United States Patent
Furubo

(10) Patent No.: US 7,813,837 B2
(45) Date of Patent: Oct. 12, 2010

(54) ROBOT CONTROL SYSTEM

(75) Inventor: Takayuki Furubo, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 737 days.

(21) Appl. No.: 11/438,884

(22) Filed: May 23, 2006

(65) Prior Publication Data
US 2007/0005189 A1    Jan. 4, 2007

(30) Foreign Application Priority Data
Jun. 30, 2005    (JP)    ............... 2005-192930

(51) Int. Cl.
*G06F 19/00*    (2006.01)
(52) U.S. Cl. ............... 700/251; 356/3; 356/138; 356/147; 340/686.1; 345/161; 606/1
(58) Field of Classification Search ............... 700/245; 356/3, 138, 147; 606/1; 600/426
See application file for complete search history.

(56) References Cited

U.S. PATENT DOCUMENTS

| | | | |
|---|---|---|---|
| 2002/0120252 A1* | 8/2002 | Brock et al. ............... | 606/1 |
| 2003/0208122 A1* | 11/2003 | Melkent et al. ............... | 600/426 |
| 2003/0208304 A1* | 11/2003 | Peless et al. ............... | 700/245 |
| 2005/0166413 A1* | 8/2005 | Crampton ............... | 33/503 |

FOREIGN PATENT DOCUMENTS

JP    09-216183    8/1997

\* cited by examiner

*Primary Examiner*—Khoi Tran
*Assistant Examiner*—Rodney King
(74) *Attorney, Agent, or Firm*—Flynn, Thiel, Boutell & Tanis, P.C.

(57) ABSTRACT

A robot control system for controlling a position and an attitude of a robot head is provided with an operating head held by an operator and a sensor for detecting a position and an attitude of the operating head.

An attitude recognition portion of the control means recognizes an initial attitude of the operating head when a control switch provided at the operating head is turned on, and acquires a displacement vector from the initial attitude by a change in the attitude of the operating head.

An attitude conversion portion converts the displacement vector from the initial attitude to a displacement vector from the reference attitude corresponding to a predetermined reference attitude, and the control means makes the attitude of the robot head follow the displacement vector from the reference attitude.

In whatever attitude the operator holds the operating head, the position and the attitude of the robot head can follow the change in the position and the attitude of the operating head.

1 Claim, 2 Drawing Sheets

(a)　　　　　(b)

ROBOT CONTROL SYSTEM

FIELD OF THE INVENTION

The present invention relates to a robot control system and more particularly to a robot control system constituted so that a position and an attitude of a robot head are made to follow a position and an attitude of an operating head.

DESCRIPTION OF THE PRIOR ART

As a robot control system for controlling operation of an industrial robot or the like, the following is known.

There is known such a robot control system that a robot with a wrist provided at its tip end and an operating grip to be held by an operator are provided, and change in a position and an attitude of the operating grip made by the operator is measured by a relative position/attitude measuring device, by which a control device of the robot controls the robot so that the position and the attitude of the wrist follow the position and the attitude of the operating grip (Japanese Patent No. 2776477).

An operating switch is provided at the operating grip, and only while the operator turns on the operating switch, the relative position/attitude measuring device measures the position and the attitude of the operating grip and the operation of the robot is controlled by the control device.

Here, a 6 degree-of-freedom position/attitude sensor used in the above Japanese Patent No. 2776477 is to recognize the position of the operating grip and the attitude of the operating grip separately, and therefore, the position of the wrist is moved according to a relative position from a magnetic field generating device attached to the operator irrespective of the attitude of the operating grip.

On the other hand, the attitude of the operating grip is detected by the above 6 degree-of-freedom position/attitude sensor, but the shape of the operating grip imitates the shape of the wrist of the robot, and therefore, the operator grips the operating grip according to the attitude of the wrist of the robot.

Therefore, when the operator swings the operating grip in the horizontal direction, the wrist of the robot also swings in the horizontal direction following it.

However, if the operating grip does not imitate the wrist of the robot, the following problem will occur.

That is, even though the operating grip is manufactured on the premise of being held in the vertical direction, if the operator holds the operating grip in the lateral direction, the 6 degree-of-freedom position/attitude sensor follows and moves the position of the wrist with regard to the position of the operating grip, but if the operator swings the operating grip in the horizontal direction, the wrist swings in the vertical direction, and there is a problem that the attitude of the robot cannot be made to follow the movement of the wrist accurately.

SUMMARY OF THE INVENTION

In view of such a problem, an object of the present invention is to provide a robot control system which can follow a position and an attitude of a robot head with respect to the position and the attitude of an operating grip in whatever attitude an operator holds the operating grip.

That is, the robot control system in the present invention comprises control means for controlling operation of a robot provided with a robot head, an operating head held by an operator and having a control switch operated by the operator, and a sensor for detecting a position and an attitude of the operating head in a reference coordinate system, in which the control means recognizes the position and the attitude of the operating head through the sensor while the control switch is on so that the position and the attitude of the robot head follow change in the position and the attitude of the operating head, wherein the control means is set with a predetermined attitude of the operating head as a reference attitude of the operating head and recognizes an initial attitude of the operating head when the control switch is turned on through the sensor and acquires a displacement vector indicating a change in the attitude from the initial attitude, and further converts the displacement vector from the initial attitude to a displacement vector indicating a change in the attitude from the reference attitude and makes the attitude of the robot head follow the displacement vector from the reference attitude.

BRIEF DESCRIPTION OF THE DRAWINGS

FIG. 3 is a view explaining comparison by presence of an attitude conversion portion, in which FIG. 3A shows a case where the operating head is gripped according to the reference attitude, while FIG. 3B shows a case where the operating head is gripped in the state rotated by 90 degrees with respect to the reference attitude.

DETAILED DESCRIPTION OF THE EMBODIMENTS

Figure 1:
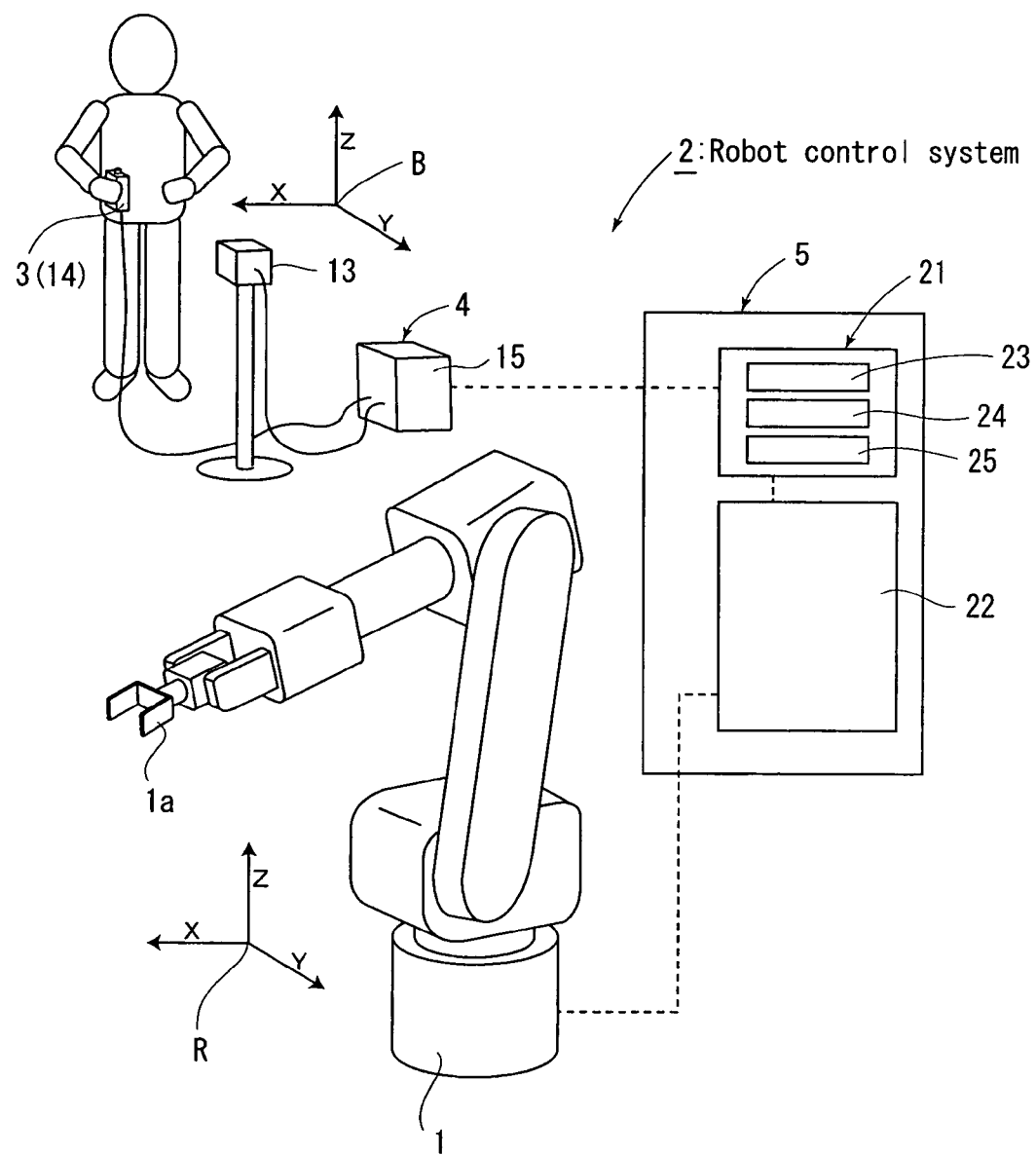
FIG. 1 is a block diagram of a robot control system according to a preferred embodiment.

An illustrated preferred embodiment will be described below. FIG. 1 shows a publicly known industrial robot 1 and a robot control system 2 for controlling the robot 1.

The robot 1 is a 6-axis multi-joint robot, and a robot head 1a such as a gripper for gripping an article is provided at its tip end. As this robot head 1a, injection means for painting or a gun for welding can be attached other than the gripper.

The robot control system 2 is provided with an operating head 3 held by an operator, a sensor 4 for detecting a position and an attitude of the operating head 3 in a predetermined reference coordinate system, and control means 5 for recognizing a change in the position and the attitude of the operating head 3 detected by the sensor 4 and for controlling operation of the robot 1.

And in the robot control system 2 of this preferred embodiment, when the operator changes the position and the attitude of the operating head 3, the change in the position and the attitude is detected by the sensor 4, and the robot 1 is controlled by the control means 5 so that the position and the attitude of the robot head 1a follow the change in the position and the attitude of the operating head 3.

Figure 2:
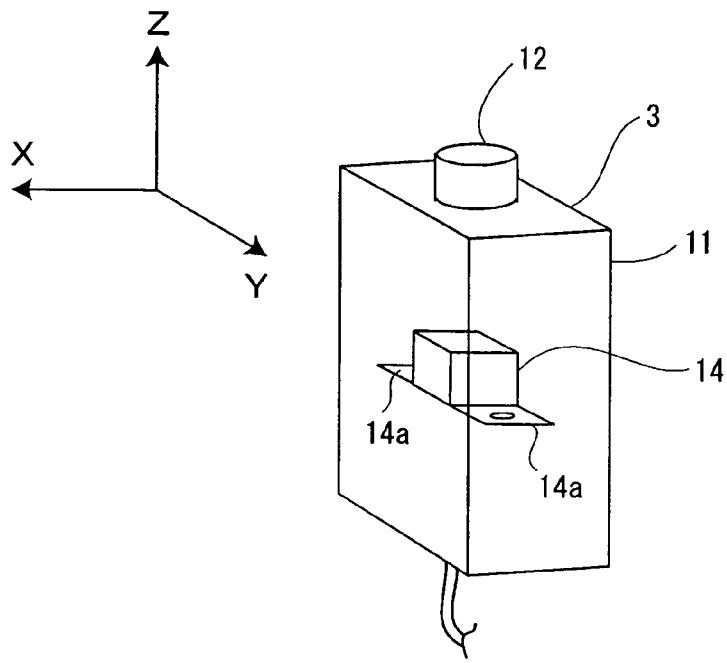
FIG. 2 is an enlarged view of an operating head.

FIG. 2 is a view showing the above operating head 3, and the operating head 3 is comprised by a substantially rectangular case 11 which can be gripped by the operator and a control switch 12 provided at the top portion of the case 11. And this control switch 12 sends a signal to the control means 5 only while being pressed by the operator.

Next, the above sensor 4 is provided with an origin portion 13 installed at a position adjacent to the operator holding the operating head as shown in FIG. 1, a movement portion 14 provided in the case 11 of the operating head 3 as shown in FIG. 2, and a body portion 15 to which the origin portion 13 and the movement portion 14 are connected.

The origin portion 13 is provided with three coils, not shown, and each of the coils is oriented in the X-axis direction faced horizontally, in the Y-axis direction faced horizontally and orthogonal to the X-axis direction, and in the Z-axis direction faced perpendicularly. And by each of the coordinate axes of these X-axis, Y-axis and Z-axis, a reference coordinate system B is set as a predetermined reference coordinate system with the intersection of these coordinate axes as an origin.

Rotating coordinates are set for the reference coordinate system B with each of the coordinate axes as their respective rotational centers, and the Ψ coordinate rotating around the X-axis, the Θ coordinate rotating around the Y-axis and the Φ axis rotating around the Z-axis are set, respectively. And the position and the attitude of the operating head 3 are detected based on this reference coordinate system B.

And a robot coordinate system R is set for the robot 1, and the position and the attitude of the robot head 1a are changed based on this robot coordinate system R, and the reference coordinate system B is set in parallel with the robot coordinate system R in this preferred embodiment.

Next, the movement portion 14 is also provided with three coils, not shown, and these coils are oriented in the directions orthogonal to each other at the origin as with the origin portion 13.

Moreover, at a lower part of the movement portion 14, fixing pieces 14a for fixing the movement portion 14 to the case 11 are provided extending on both sides, and in this preferred embodiment, a direction in which the fixing pieces 14a extend is the Y-axis, the vertical direction of the movement portion 14 orthogonal to the Y-axis is the Z-axis and the direction orthogonal to the Y- and Z-axes are the X-axis.

And the attitude of the operating head 3 when the directions of the X-, Y- and Z-axes by the three coils of this movement portion 14 match the directions of the X-, Y- and Z-axes by the three coils of the origin portion 13, that is, the attitude when the directions of the X-, Y- and Z-axes of the reference coordinate system B match the directions of the X-, Y- and Z-axes of the movement portion 14 and moreover, the attitude when the directions of the X-, Y- and Z-axes of the movement portion 14 match the robot coordinate system R are hereinafter referred to as the reference attitude of the operating head 3.

The body portion 15 generates a magnetic field from the three coils by supplying electric power to the origin portion 13, and the position and the attitude of the movement portion 14 are detected from the movement portion 14 with respect to the reference coordinate system B set in the origin portion 13 by detecting an induction current generated in each of the coils of the movement portion 14 by this magnetic field.

Since the sensor 4 used in this preferred embodiment is a 6-degree-of-freedom magnetic sensor also described in the above Japanese Patent No. 2776477 and others and publicly known, further detailed explanation will be omitted.

The control means 5 is provided with a command output portion 21 for outputting a signal required for control of the robot 1 from the position and the attitude of the operating head 3 detected by the sensor 4, and a robot controller 22 for making the position and the attitude of the robot head 1a follow a change in the position and the attitude of the operating head 3 by controlling the robot 1 according to a signal from the command output portion 21.

Moreover, the command output portion 21 is provided with a position recognition portion 23 for recognizing a change in the position of the movement portion 14 detected by the sensor 4, an attitude recognition portion 24 for recognizing a change in the attitude of the movement portion 14, and an attitude conversion portion 25 for converting the attitude so that the attitude of the robot head 1a follows the change in the attitude of the operating head 3 recognized by the attitude recognition portion 24.

The position recognition portion 23 recognizes a coordinate value where the origin of the movement portion 14 is located with respect to the reference coordinate system B set in the origin portion 13 as a position vector and recognizes the position vector as an initial position when the operator turns on the control switch 12 of the operating head 3. When the position of the operating head 3 is changed, the position recognition portion 23 acquires a difference of the changing position vector and recognizes it as a displacement vector indicating the change in the position.

The attitude recognition portion 24 recognizes an angular difference of the X-, Y- and Z-axes of the movement 14 with respect to the X-, Y- and Z-axes of the reference coordinate system B by the change in the attitude of the movement portion 14 as an attitude vector, and recognizes the attitude vector when the operator turns on the control switch 12 of the operating head 3 as an initial attitude. When the attitude of the operating head 3 is changed, the attitude recognition portion 24 acquires a difference of the changing attitude vector and recognizes the change in the attitude from the initial attitude as a displacement vector.

The attitude conversion portion 25 converts the displacement vector of the attitude from the initial attitude recognized by the attitude recognition portion 24 to a displacement vector from the reference attitude as will be described later in detail.

The robot controller 22 recognizes the position and the attitude of the robot head 1a when the operator presses the control switch 12 as an operation start point based on the robot coordinate system R and after that, changes the position of the robot head 1a according to the displacement vector of the position recognized by the position recognition portion 23 and controls the robot 1 so that the attitude of the robot head 1a is changed according to the displacement vector of the attitude from the reference attitude converted by the attitude conversion portion 25.

And when the operator turns off the control switch 12, the robot controller 22 immediately stops the operation of the robot 1.

Control of the robot 1 by the robot control system 2 having the above construction will be described below. The description will be made with a position vector at the origin position of the reference coordinate system B as (X0, Y0, Z0) and an attitude vector of the origin attitude as (Ψ0, Θ0, (Φ0).

When the operator holds the operating head 3 and turns on the control switch 12, the sensor 4 detects a position and an attitude of the movement portion 14 with respect to the origin portion 13, the position recognition portion 23 of the command output portion 21 recognizes a position vector (X1, Y1, Z1) of the initial position of the operating head 3 and the attitude recognition portion 24 recognizes an attitude vector (Ψ1, Θ1, Φ1) of the initial attitude of the operating head 3.

Figure 3:
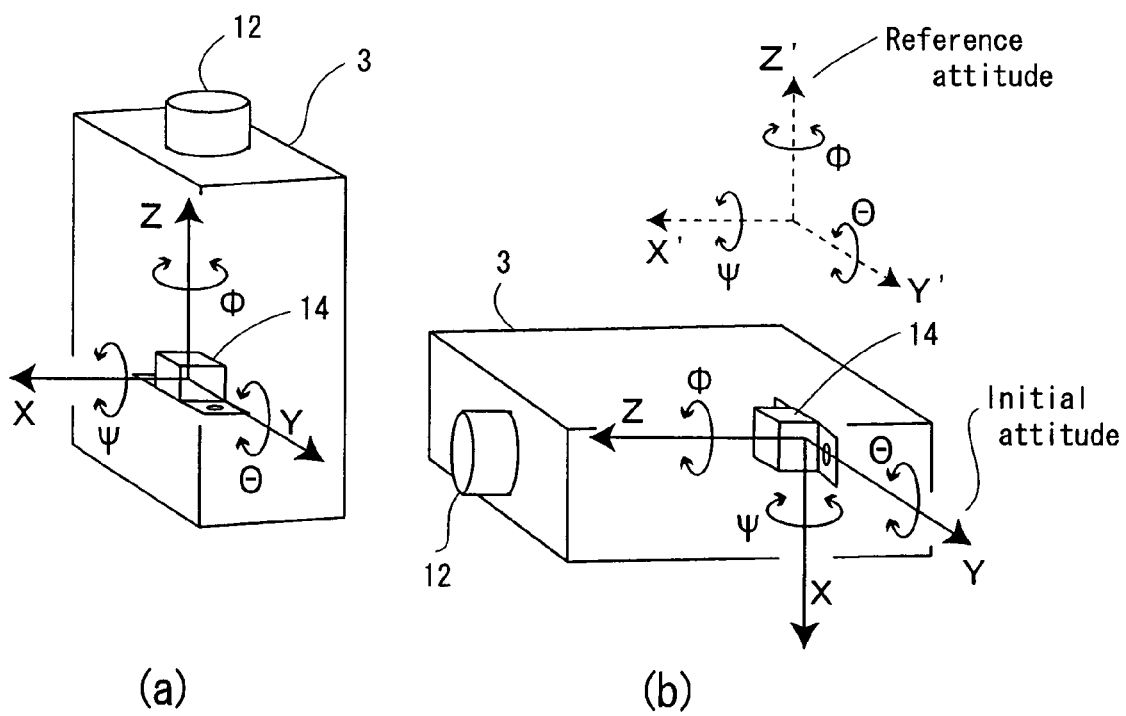

And the attitude conversion portion 25 has a reference attitude set in advance, and the reference attitude of the operating head 3 is set with the operating head 3 in an attitude so that, as shown in FIG. 3, the directions of the three coils in the movement portion 14 match the directions of the three coils in the origin portion 13. That is, the reference attitude can be represented by the same attitude vector (Ψ0, Θ0, Φ0) as that of the origin attitude.

And the robot controller 22 takes the position and the attitude of the robot head 1a as an operation start point when the control switch 12 is turned on irrespective of the position and the attitude of the robot head 1.

And when the operator changes the position and the attitude of the operating head 3 while pressing down the control switch 12, the sensor 4 detects the position and the attitude of the movement portion 14 with a predetermined time interval, and the position and the attitude of the operating head 3 detected by the sensor 4 immediately after the control switch 12 is pressed is processed as follows.

At the position recognition portion 23, the position vector (X2, Y2, Z2) of the movement portion 14 after movement when a predetermined time has elapsed from the initial position (X1, Y1, Z1) is recognized, and a displacement vector of the position (x2, y2, z2) is calculated by subtracting the initial position (X1, Y1, Z1) from this position vector (X2, Y2, Z2).

At the attitude recognition portion 24, the attitude vector ($\Psi 2, \Theta 2, \Phi 2$) of the movement portion 14 after movement with respect to the initial attitude (105 1, $\Theta 1, \Phi 1$) is recognized, and a displacement vector ($\Psi 2, \Theta 2, \Phi 2$) of the attitude from the initial attitude is calculated by subtracting the initial attitude ($\Psi 1, \Theta 1, \Phi 1$) from this attitude vector ($\Psi 2, \Theta 2, \Phi 2$).

At the attitude conversion portion 25, a sum of the displacement vector ($\Psi 2, \Theta 2, \Phi 2$) of the attitude with respect to the initial attitude and the initial attitude vector ($\Psi 1, \Theta 1, \Phi 1$) is acquired, and a displacement vector from the origin attitude is calculated by subtracting the initial attitude vector ($\Psi 1, \Theta 1, \Phi 1$) from this.

This displacement vector from the initial attitude also represents a displacement vector from the reference attitude in other words, and the attitude conversion portion 25 recognizes the displacement vector calculated here as a displacement vector from the reference attitude.

That is, by subtracting the attitude vector after the next movement from the attitude vector of the initial attitude of the operating head 3, a displacement vector of the attitude changed from the initial attitude after a predetermined time has elapsed is calculated, and by adding the attitude vector of the initial attitude to this attitude displacement vector once, a change in the attitude from the origin attitude based on the reference coordinate system B is added.

And when the attitude vector of the initial attitude is subtracted again from the sum of this attitude displacement vector and the attitude vector of the initial attitude, a difference from the origin attitude is inversed and calculated as a displacement vector from the origin attitude, by which the change in the attitude from the reference attitude can be recognized.

And the position recognition portion 23 and the attitude conversion portion 25 send the position displacement vector and the attitude displacement vector with respect to the reference attitude to the robot controller 22, and the robot controller 22 controls the robot 1 on the basis of the robot coordinate system R so that the position and the attitude of the robot head 1a correspond to each of these displacement vectors.

At this time, the attitude of the robot head 1a changes according to the displacement vector from the reference attitude as a change in the attitude from the reference attitude, but the direction of change in this attitude matches the direction to which the operator tilts the operating head 3.

When this is to be described using FIG. 3, FIG. 3A shows a view when the movement portion 14 is in the reference attitude, and FIG. 3B shows the initial attitude when the operator turns on the control switch 12 in the state where the operating head 3 is rotated by 90 degrees around the Y-axis.

In this preferred embodiment, the initial attitude in FIG. 3B is recognized by the attitude recognition portion 24, and when the change in the attitude of the movement portion 14 is recognized, the attitude recognition portion 24 acquires a displacement vector from the initial attitude according to the recognized change in the attitude, and the attitude conversion portion 25 converts the displacement vector from the initial attitude to a displacement vector representing a change in the attitude from the reference attitude (shown by a broken line).

That is, when the operating head 3 is rotated around the axis in the lateral direction, in the case of FIG. 3A, the movement portion 14 is rotated around the X-axis by ($\Phi 1, 0, 0$), while in the case of FIG. 3B, the actual movement of the operating head 3 is rotated around the Z-axis, but on control, the movement portion 14 changes the attitude from the reference attitude in the same direction and by the same change amount as the actual movement as a change in the attitude from the reference attitude. Therefore, it is recognized as rotation around the X'-axis only by ($\Phi 1', 0, 0$).

As a result, in either case of 3A or 3B, the robot controller 22 rotates the robot head 1a around the X axis in the robot coordinate system R only by ($\phi 1, 0, 0$), and in the same way as the operator's operation to change the attitude of the operating head 3, the attitude of the robot head 1a follows and changes so as to rotate around the axis facing in the lateral direction (X axis, X' axis).

On the contrary, if the attitude conversion portion 25 is not provided, the movement portion 14 is recognized to be rotated around the Z-axis only by ($0, 0, \Phi 1$) according to the movement of the operating head 3.

Therefore, the robot controller 22 rotates the robot head 1a around the Z-axis in the robot coordinate system R only by ($0, 0, \phi 1$), and since the Z-axis faces the perpendicular direction, the robot head 1a is rotated in the horizontal direction around the axis facing the vertical direction (Z-axis) contrary to the image of the operator.

In this way, by making conversion to the change in the attitude from the reference attitude all the time by the attitude conversion portion 25, in whatever attitude the operator holds the operating head 3, the position and the attitude of the robot head 1a can follow the change in the position and the attitude in the image of the operator.

After the operator presses the control switch 12 to change the position and the attitude of the operating head 3 till the operator releases the control switch 12 at the end, the following processing is repeated as below with a predetermined time interval.

At the position recognition portion 23, by subtracting the previous position vector detected immediately before that from the currently acquired position vector, a displacement vector representing a change in the position at this time is calculated continuously from the initial position.

Also, at the attitude recognition portion 24, by subtracting the previous attitude vector detected immediately before that from the currently acquired attitude vector, a displacement vector of the attitude representing a change in the attitude at this time is calculated continuously from the initial attitude.

And at the attitude conversion portion 25, when the above attitude displacement vector calculated at the attitude recognition portion 24 is inputted, a sum of this displacement vector and the previous attitude vector is acquired, and by subtracting the previous attitude vector from this, conversion is made into a displacement vector from the reference attitude.

As a procedure of conversion of the displacement vector by the attitude conversion portion 25, it is possible to assume that the displacement vector calculated by the attitude change this time as a change in the attitude from the initial attitude. That is, by subtracting the attitude vector of the initial attitude from the sum of the displacement vector and the attitude vector of the initial attitude, the same result as the above conversion can be obtained. Also, in place of the attitude vector of the initial attitude, a predetermined vector separately set may be applied.

And the position recognition portion 23 and the attitude conversion portion 25 send the acquired position displacement vector and the attitude displacement vector from the reference attitude to the robot controller 22, and the robot controller 22 controls the robot 1 so that the position and the attitude of the robot head 1a immediately before that are changed following each of these displacement vectors.

By this, the position and the attitude of the robot head 1a can be changed following a change from the position and the attitude of the operating head 3 in the initial state when the control switch 12 is turned on to the position and the attitude of the operating head 3 after that.

In this preferred embodiment, the position and the attitude of the robot head 1a are changed immediately after the position and the attitude of the operating head 3 are changed, but it is possible that the change in the position and the attitude of the operating head 3 is stored in the robot controller 22 or the like and it can be used in so-called teaching of the robot 1.

What is claimed is:

1. A robot control system comprising:

control means for controlling operation of a robot having a robot head in a robot coordinate system consisting of orthogonally-related X-, Y- and Z-axes;

an operating head held by an operator, the operating head including a control switch manipulated by the operator; and a 6-degree of freedom magnetic sensor for detecting a position and an attitude of the operating head in a reference coordinate system consisting of X-, Y- and Z-axes in parallel with the robot coordinate system, wherein the control means recognizes a position and an attitude of the operating head in the reference coordinate system through the sensor while the control switch is turned on so that a position and an attitude of the robot head in the robot coordinate system follow a change in the position and the attitude of the operating head, the control means sets a predetermined attitude of the operating head as a reference attitude of the operating head in the reference coordinate system, recognizes an attitude vector of an initial attitude of the operating head when the control switch is turned on through the sensor, recognizes an attitude vector of a changed attitude of the operating head resulting from movement of the operating head from the initial attitude after a predetermined time interval has elapsed, acquires a first displacement vector representing a change in the attitude from the initial attitude based on a difference between the attitude vector of the initial attitude and the attitude vector of the changed attitude caused immediately after the control switch is turned on, and converts the first displacement vector to a second displacement vector representing the change in the attitude from the reference attitude in the reference coordinate system by subtracting the attitude vector of the initial attitude from a sum of the first displacement vector and the attitude vector of the initial attitude so that the attitude of the robot head follows the second displacement vector until the control switch is turned off, to thereby recognize, in whatever attitude the operator holds the operating head and turns on the operating switch, the operating head on the basis of the change in attitude from the reference attitude instead of the change in attitude from the initial attitude so that the attitude of the robot head follows the change in attitude of the operating head.

* * * * *